United States Patent

[11] 3,585,906

[72] Inventor Hillebrand Johannes Josephus Kraakman
    Emmasingel, Eindhoven, Netherlands
[21] Appl. No. 858,419
[22] Filed Sept. 16, 1969
[45] Patented June 22, 1971
[73] Assignee U.S. Philips Corporation
    New York, N.Y.
[32] Priority Sept. 18, 1968
[33] Netherlands
[31] 6813305

[54] PISTON SEALING CONTROL SYSTEM
    2 Claims, 1 Drawing Fig.
[52] U.S. Cl. .................................................. 92/111,
    91/422, 92/127, 92/165, 92/181
[51] Int. Cl. ...................................................... F01b 31/00
[50] Field of Search ............................................ 92/162-
    −165, 109—113, 51, 61, 65, 81, 82, 146, 181,
    182; 91/422; 277/705; 308/363

[56] References Cited
    UNITED STATES PATENTS
    2,754,847  7/1956  Ashton et al. ................. 92/51 X
    3,319,534  5/1967  Boonshaft ..................... 92/162

Primary Examiner—Martin P. Schwadron
Assistant Examiner—Allen M. Ostrager
Attorney—Frank R. Trifari ABSTRACT: A control system for sealing a hydrostatically journaled working piston relative to the wall of a working cylinder, in which a fluid pressure acts on both piston end faces. The circumference of the piston comprises at least two circumferential grooves located near each end face of the piston. A plurality of shallow bearing chambers are arranged on the circumference of the piston between the grooves. A cylinder is secured in the piston which has a movable adjusting element consisting of at least two pistons of equal diameters secured together by a rod. The free end face of the first piston of the element is in open communication with the fluid acting on an end face of the working piston. The second groove communicates with a space which communicates with the free end face of the second piston. The first groove communicates, through a bore in the working piston, with the space between the first and the second piston. The first piston has at least one slot-shaped axially extending recess on its circumference which communicates with the space between the first and the second piston and which also opens into an annular chamber in the inner wall of the cylinder. The chamber communicates, through an aperture in the cylinder wall, with a duct for removing fluid from the annular chamber.

PATENTED JUN 22 1971
3,585,906
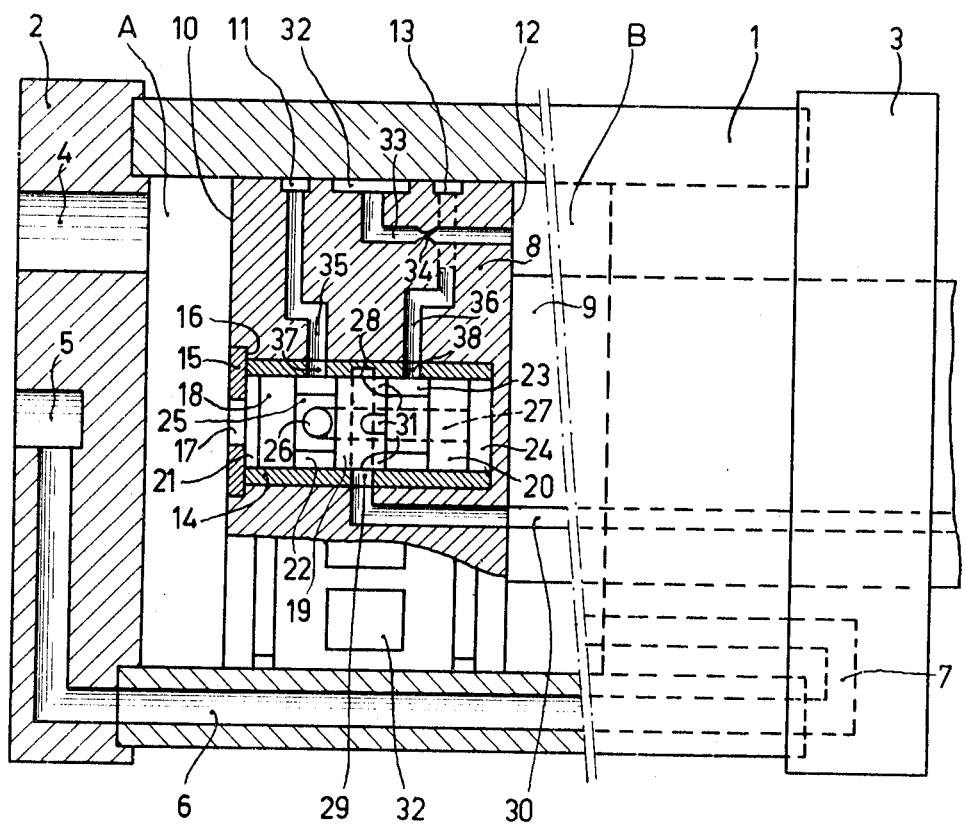
INVENTOR.
HILLEBRAND J.J KRAAKMAN
BY
AGENT

PISTON SEALING CONTROL SYSTEM

The invention relates to a device for sealing a hydrostatically journaled piston, against the wall of a working cylinder which is closed at both ends. The piston is provided on at least one side, with a piston rod supplying effective work, and a fluid pressure acts upon both piston end faces. The piston rod, which supplies effective work, is preferably hydrostatically journaled therein passes through a cylinder cover outside the working cylinder. The circumference of said working piston is provided with at least two grooves, a first of which is situated near the end face of the piston to which the piston rod supplying the effective work is secured, the second groove being situated near the other piston end face. A number of shallow bearing chambers are arranged on the circumference of the piston.

A seal in such devices is of particular importance when manufacturing parts with optical correct surfaces and when using a linear motor for moving the component to be machined, or the machine tool (such as chisel, milling tool, grinding stone, etc.) on tools, such as lathes, milling machines, grinding benches and the like. In the most frequently used drive, the rotation of a spindly with a transport nut is converted into a linear movement with which other sources are present which cause inadmissible errors as to size and roughness. Moreover, the pitch of the spindle is usually found repeated on the workpiece. Furthermore, even very small errors in alignment produce periodically disturbing forces in the machine, which can be seen and measured on an accurately machined surface. When, however, requirements of accuracy in size are in the range of $0.1\mu$ and roughness tolerances are within one-half ru = approximately $0.01\mu$, the spindle drive is no longer suitable and a drive by a piston-cylinder combination is the appropriate solution. In producing optically accurate parabolic mirrors of metal for example, it has been found that with a piston-cylinder drive of the workpiece and/or the milling tool, the light reflection is 20 percent higher than with a spindle drive.

With such a piston-cylinder combination, a constant piston speed can be achieved with deviations in speed within 0.1 percent, if:

1. the diameter of the cylinder is equal in any cross section
2. the supply pressure of the liquid on the piston and the external load remain constant,
3. the leakage flow along the piston is constant and as small as possible.

The second condition is relatively easy to achieve, the first and third conditions, however, are harder, since the dynamic sealing of the piston against the entire cylinder wall may not influence the travel properties of the piston.

In a piston, which can be clamped, which is often desirable, applicants have proposed a construction which gives good results. For a piston which cannot or need not be held in one particular position, according to the invention, the above-mentioned device is characterized in that a continuously movable element is provided in the working piston, which element consists of at least two pistons connected together by a rod having the same diameter and are axially movable relative to the working piston in a cylinder provided in the working piston. The free end face of the first piston of the element is in open communication with the fluid which acts on the end face of the working piston remote from the rod of the working piston. The second groove communicates with a space adjoining the free end face of the second piston in the cylinder surrounding the element, the first groove communicates, through a bore in the working piston with the space not occupied by the rod between the first and the second piston. The first piston has at least one slot-shaped axially extending recess on its circumference communicating with the space between the first and the second piston and furthermore opens into an annular chamber in the inner wall of the cylinder. The chamber communicates through an aperture in the cylinder wall, with a duct for removing the fluid from the annular chamber. The fluid pressure in the second groove and in the bearing chambers is regulated by the element in accordance with the fluid pressure which prevails behind the working piston in the space between the end face of the working piston which is not provided with a driving rod and the cylinder cover situated opposite to said end face.

According to an embodiment of the invention, a favorable construction of the assembly is obtained, if an annular recess is provided in the first piston, which recess communicates with the second groove via a duct in the working piston, said annular recess communicating, through a bore in the element, with the space communicating with the free end face of the second piston.

In order that the invention may be readily carried into effect, one example of the invention will now be described in greater detail, by way of example, with reference to the accompanying drawing, which shows a partly diagrammatic cross-sectional view through a cylinder, incorporating a hydrostatically journaled piston with piston rod.

In the drawing, reference numeral 1 denotes a cylinder which comprises two cylinder covers 2 and 3. The cylinder cover 2 comprises a liquid inlet and outlet aperture 4, as well as a similar aperture 5 which communicates with a duct 6 in the cylinder wall. This duct 6 in turn communicates with a duct 7, in the cover 3. The cylinder comprises a piston 8 to which a piston rod 9 is secured which is passed to the outside through the cover 3. Both the piston 8 and the rod 9 are hydrostatically journaled. The bearing of the piston 8 will be described in detail. Near one end face 10 of the piston 8 an annular groove 11 is present on the circumference of the piston. Near an end face 12, to which the rod 9 is secured, a corresponding annular groove 13 is provided on the circumference of the piston.

The piston comprises a cylinder 14, which is provided in the piston through an aperture 16 which is covered by a cover plate 15. Said cover plate has an aperture 17. The cylinder 14 has three equal pistons 18, 19 and 20. Between one end face of the piston 18 and the plate 15 a chamber 21 is situated which is in open communication, through the aperture 17, with the space A situated between the rear end face 10 of the piston 8 and the cylinder cover 2. Between the piston 18 and the central piston 19 an annular recess 22 is formed; between the other end face of the piston 19 and the end face of the piston 20, a chamber 23 is situated and a chamber 24 is situated between another end face of the piston 20 and the piston 8. In the rod 25, which connects the pistons 18 and 19, an aperture 26 is present which communicates with the chamber 24 through a duct 27. The cylinder 14 furthermore comprises, at the height of the central piston 19, a circumferential groove 28 which communicates with the outside air through an aperture 29 in the cylinder wall and a duct 30. The outer circumference of the piston 19 furthermore comprises a number of slots 31, which open into chamber 23.

On the outer circumference of the piston 8, a number of shallow chambers 32 are situated. These chambers which are bearing chambers communicate, through ducts 33 in each of which a resistance 34 is provided, with the space B in which the working pressure prevails; the oil which has this pressure, is supplied to the space B, through ducts 5 and 7. An annular groove 11 in which the average bearing chamber pressure prevails communicates with the space 22 through a duct 35 and an aperture 37 in the wall of the cylinder 14. An annular groove 13, to which the liquid flows away from the bearing chamber through the bearing gap between the piston 8 and the cylinder 1, communicates with chamber 23, via a duct 36 and an aperture 38 in the wall of the cylinder 14.

The construction described is destined for a linear motor in which the piston rod cannot be clamped, since the oil pressure behind the piston in the space A cannot be regulated by the regulating valve in accordance with the working pressure in the space B. The pressure which prevails in the space A acts on the piston 18. The pressure which occurs in the groove 11, and which consequently is equal to the average pressure in the bearing chamber 32, prevails in the chamber 24. The pressure is transferred from the annular groove 11 to the chamber 24, through duct 35, aperture 26 and duct 27. It is obvious that the pistons 18, 19 and 20 in the cylinder 14 assume an equilibrium condition, when the pressure in the chamber 21 on the piston 18 is equal to the pressure in the chamber 24 on the piston 20. This means that the pressure in the space A is equal to the pressure in the annular groove 11, so that no leak occurs from the space A via the wall of the piston. The linearity in the movement of the piston 8 can consequently not be influenced by leak along the piston 8. Small deviations from the desired diameter of the cylinder 1 cannot result in any leak, since the pressure in the space A is equal to the pressure in the annular groove 11, and hence no flow can occur between the space A and the annular groove 11. The pressure in the bearing chambers 32 is derived from the pressure in the space B, but is reduced by the fixed resistances 34. The pressure in the chambers 32 is furthermore determined by the resistance to flow in the bearing gap between the chambers 32 and the annular groove 13 and furthermore by the adjustable resistance in the outlet ports which communicate with the outside air via duct 30. The outlet ports are formed by the orifice of the slots 31 and the circumferential groove 28, the size of the outlet ports being dependent upon the position of the piston assembly 18, 19, 20 in the cylinder 14.

When, for example, the pressure in the space A increases, this means in the first instance that liquid will leak from the space A along the piston, since now the pressure in the bearing chambers 32 and in the annular groove 11 is lower than the pressure in the space A. However, as a result of the larger pressure in the space 21 on the piston 18, the piston assembly 18, 19 and 20 will move to the right. As a result of this the size of the outlet ports (constituted by the slots 31 and circumferential groove 28) becomes smaller and the resistance to flow through the outlet ports hence becomes larger. As a result of this, the pressure in the bearing chambers 32, and hence also in the annular groove 11 will increase. The pressure in the annular groove 11 also prevails in the chamber 24 and the piston assembly 18, 19, 20 will consequently be in equilibrium again, when the pressure in the space 24 has increased to such a value that it is equal to the pressure in the space A. In this case, the pressure in the annular groove 11 and in the bearing chambers 32 is again equal to the pressure in A, so that again no leak occurs from the space A along the wall of the piston 8.

The liquid pressure which prevails in the annular groove 11, namely by the communication with space 24, is measured in the regulating valve. No flow of liquid occurs in the annular groove. The pressure of the liquid in the groove 33 (and hence also the pressure in the chambers 32) is regulated. Flow of liquid does occur in the groove 33, but the pressure of said liquid which is conducted to the chamber 23 exerts no resulting force on the piston assembly 18, 19, 20 and hence does not influence the position of the piston assembly in the cylinder 14. As a result of this the regulating valve has a very favorable effect.

An advantage of the device described is that the operation of the regulating valve is independent of the dimensions of the main cylinder or the working piston.

I claim:

1. A control system for sealing a hydrostatically journaled working piston against the wall of a cylinder carrying said piston, said cylinder being closed at both its ends by cylinder covers, said working piston having a hydrostatically journaled piston rod attached to at least one of its end faces and extending through one of said cylinder covers for supplying effective work, said working piston having fluid pressure acting on both end faces thereof, said system comprising a first circumferential groove located on the circumferential surface of said working piston adjacent the end face thereof having said piston rod, a second circumferential groove located on the circumferential surface of said working piston adjacent the other end face thereof, a plurality of shallow bearing chambers about the circumferential surface of said working piston for hydrostatically journaling said working piston in said piston carrying cylinder, said chambers being located between said first and second circumferential grooves, a cylindrical body axially extending partially through and centrally located within said working piston, a cover plate covering the open end of said body, a control element axially movable within said body, said control element comprising first and second control pistons of equal diameters connected together by a rod thereby forming an end space between the end face of said second control piston and the closed end of said body and a middle space between said first and second control pistons, an aperture through said cover plate communicating with the fluid acting on the end face of the working piston not having said piston rod so that said fluid also acts on said first control piston, first duct means in said working piston communicating between said second circumferential groove and said end space, second duct means communicating between said first circumferential groove and said middle space, at least one slot-shaped axially extending recess on the circumferential surface of said first control piston communicating with said middle space, an annular chamber on the inner wall of said body in communication with said slot-shaped recess, and third duct means through said working piston connected to said annular chamber through an aperture in the wall of said body for removing fluid from said annular chamber.

2. The control system according to claim 1 wherein said first duct means communicating between said second groove and said end space comprises an annular recess on the circumference of said first control piston, a duct in said working piston communicating between said recess and said second groove, a bore in said control element communicating with said recess, and a duct through said control element communicating between said bore and said end space.